US012800001B2

(12) United States Patent
Lin et al.

(10) Patent No.: US 12,800,001 B2
(45) Date of Patent: Nov. 17, 2026

(54) VIBRATION DAMPING DEVICE AND VIBRATION DAMPING SYSTEM INCLUDING THE SAME

(71) Applicant: INDUSTRIAL TECHNOLOGY RESEARCH INSTITUTE, Hsinchu (TW)

(72) Inventors: Jheng-Jie Lin, Taichung City (TW); Hsiao-Chen Ho, Taichung City (TW); Chien-Chih Liao, Taichung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 381 days.

(21) Appl. No.: 18/608,564

(22) Filed: Mar. 18, 2024

(65) Prior Publication Data

US 2025/0207651 A1 Jun. 26, 2025

(30) Foreign Application Priority Data

Dec. 26, 2023 (TW) ................................ 112150720

(51) Int. Cl.
*F16F 7/10* (2006.01)
*F16F 7/104* (2006.01)
(Continued)

(52) U.S. Cl.
CPC ............ *F16F 7/1005* (2013.01); *F16F 7/104* (2013.01); *F16F 15/22* (2013.01); *F16F 15/28* (2013.01);
(Continued)

(58) Field of Classification Search
CPC .......... F16F 7/104; F16F 7/1005; F16F 15/22; F16F 15/28; F16F 2230/18; F16F 2228/04
(Continued)

(56) References Cited

U.S. PATENT DOCUMENTS 5,915,508 A * 6/1999 Lai ........................ F16F 15/085 52/167.2
6,296,093 B1 * 10/2001 Norris .................... G05D 19/02 409/141
(Continued)

FOREIGN PATENT DOCUMENTS

CN 102995786 B 10/2014
CN 103867636 B 11/2015
(Continued)

OTHER PUBLICATIONS

Taiwanese Office Action and Search Report for Taiwanese Application No. 112150720, dated Aug. 8, 2024.

*Primary Examiner* — Christopher P Schwartz
(74) *Attorney, Agent, or Firm* — Birch, Stewart, Kolasch & Birch, LLP

(57) ABSTRACT

The vibration damping system includes a vibration damping device on a processing machine and a control unit. The vibration damping device includes a base, a rigid module, a drive module, a counterweight module and a damping module disposed on the counterweight module. The rigid module includes a holder, a guide bar connected to the holder and a moving member disposed on the guide bar. The drive module drives the moving member to move along a first axis. The counterweight module includes a guider and a counterweight mass unit movable along a second axis through the guider. The control unit controls the processing machine and controls the drive module to change a position of the moving member along the first axis according to a vibration frequency of the processing machine in real time, so that vibration frequencies of the vibration damping device and the processing machine are matched.

20 Claims, 7 Drawing Sheets

(51) Int. Cl.
*F16F 15/22* (2006.01)
*F16F 15/28* (2006.01)

(52) U.S. Cl.
CPC ....... *F16F 2228/04* (2013.01); *F16F 2230/18* (2013.01)

(58) Field of Classification Search
USPC ........ 188/378, 379, 382; 248/550, 562, 636, 248/638; 267/136; 318/609–611; 701/36, 37
See application file for complete search history.

(56) References Cited

U.S. PATENT DOCUMENTS

| | | | | |
|---|---|---|---|---|
| 10,495,176 | B2 * | 12/2019 | Lu ............................ | F16F 7/116 |
| 12,088,150 | B2 * | 9/2024 | Bretschneider .... | B23Q 11/0032 |
| 2002/0170793 | A1 * | 11/2002 | Kemeny ................. | F16F 7/104 188/378 |

FOREIGN PATENT DOCUMENTS

| | | | |
|---|---|---|---|
| CN | 105133744 | A | 12/2015 |
| CN | 106090098 | B | 8/2018 |
| CN | 112601635 | A | 4/2021 |
| CN | 216304999 | U | 4/2022 |
| CN | 113464603 | B | 2/2023 |
| CN | 116557461 | A | 8/2023 |
| EP | 2 708 316 | B1 | 9/2014 |
| JP | 2009-270647 | A | 11/2009 |
| TW | I661138 | B | 6/2019 |

* cited by examiner

VIBRATION DAMPING DEVICE AND VIBRATION DAMPING SYSTEM INCLUDING THE SAME

This application claims the benefit of Taiwan application Serial No. 112150720, filed Dec. 26, 2023, the disclosure of which is incorporated by reference herein in its entirety.

TECHNICAL FIELD

The disclosure relates to a vibration damping device and a vibration damping system including the same.

BACKGROUND

During the manufacturing or machining process of a workpiece, the processing machine is prone to vibration due to its structural inability to withstand the cutting forces. The vibration of the processing machine will cause many adverse effects, such as shortening the life of the spindle of the processing machine, accelerating the wear rate of the tool, affecting the surface quality of the workpiece (e.g., surface roughness), etc. However, if the strength of the processing machine is reduced, the efficiency of manufacturing or machining process will be lowered. For example, if the cutting depth of the tool is reduced to improve the vibration of the processing machine, the cutting efficiency will be lowered.

SUMMARY

The disclosure is directed to a vibration damping device and a vibration damping system including the same.

According to one embodiment, a vibration damping system for a processing machine is provided. The vibration damping system includes a vibration damping device and a control unit. The vibration damping device includes a base, a first rigid module, a first drive module, a first counterweight module and a damping module. The base is disposed on the processing machine. The first rigid module includes a first holder, a first guide bar and a first moving member. One end of the first guide bar is connected to the first holder. The first moving member is movably disposed on the first guide bar along a first axis. The first drive module is disposed on the base and configured to drive the first moving member to move along the first axis. The first counterweight module includes a first counterweight mass unit and a first linear guider. The first linear guider extends along a second axis perpendicular to the first axis. The first counterweight mass unit is connected to the first holder and movable in the second axis through the first linear guider. The damping module is disposed on the first counterweight module. The control unit is configured to control the processing machine and to control the first drive module to change a position of the first moving member in the first axis according to a vibration frequency of the processing machine in real time, so that a vibration frequency of the vibration damping device matches the vibration frequency of the processing machine.

According to another embodiment, a vibration damping device for suppressing vibration of a processing machine is provided. The vibration damping device includes a base, a first rigid module, a first drive module, a first counterweight module and a damping module. The base is disposed on the processing machine. The first rigid module includes a first holder, a first guide bar and a first moving member. One end of the first guide bar is connected to the first holder. The first moving member is movably disposed on the first guide bar along a first axis. The first drive module is disposed on the base and configured to drive the first moving member to move along the first axis. The first counterweight module includes a first counterweight mass unit and a first linear guider. The first linear guider extends along a second axis perpendicular to the first axis. The first counterweight mass unit is connected to the first holder and movable in the second axis through the first linear guider. The damping module is disposed on the first counterweight module. The first drive module changes a position of the first moving member in the first axis in response to a vibration frequency of the processing machine, so that a vibration frequency of the vibration damping device matches the vibration frequency of the processing machine.

Figure 1A:
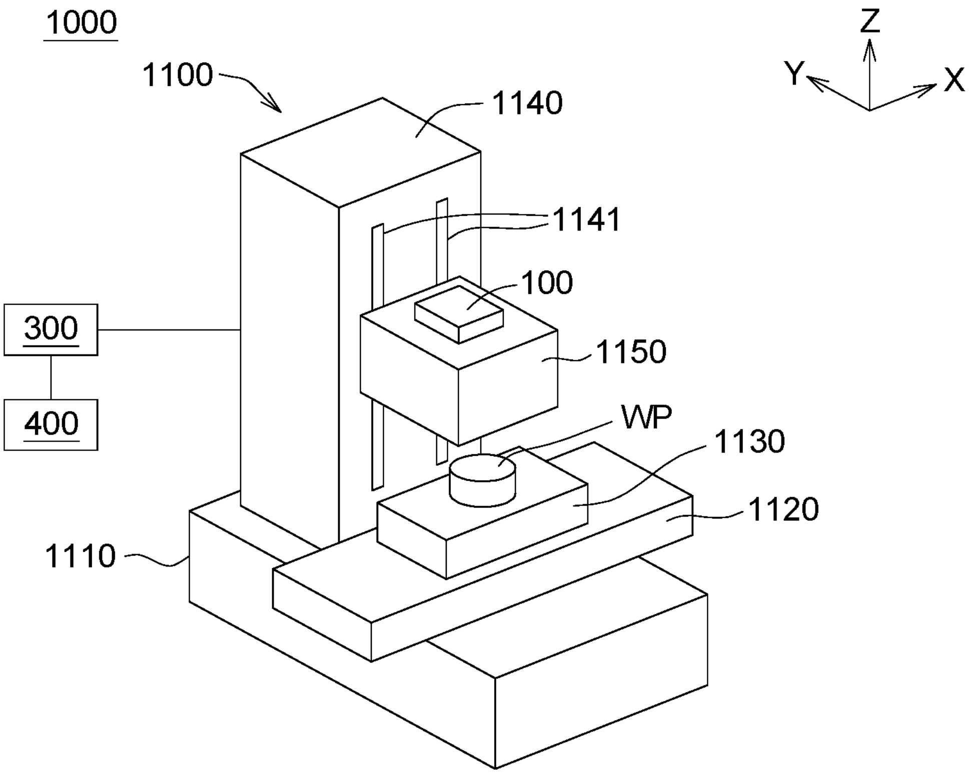
FIG. 1A is one embodiment of a vibration damping system showing that a processing machine is at a first attitude.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Each embodiment of the present disclosure will be described in detail below and illustrated with drawings. In addition to these detailed descriptions, the present disclosure may be broadly implemented in other embodiments, and easy substitutions, modifications, and equivalent variations of any of the described embodiments are encompassed within the scope of the present disclosure, and subject to the scope of the patent thereafter. In the description of the specification, many specific details and examples of embodiments are provided in order to provide the reader with a more complete understanding of the present disclosure; however, these specific details and examples of embodiments should not be considered as limitations of the present disclosure. In addition, well-known steps or components are not described in detail to avoid unnecessarily limiting the disclosure.

Figure 1B:
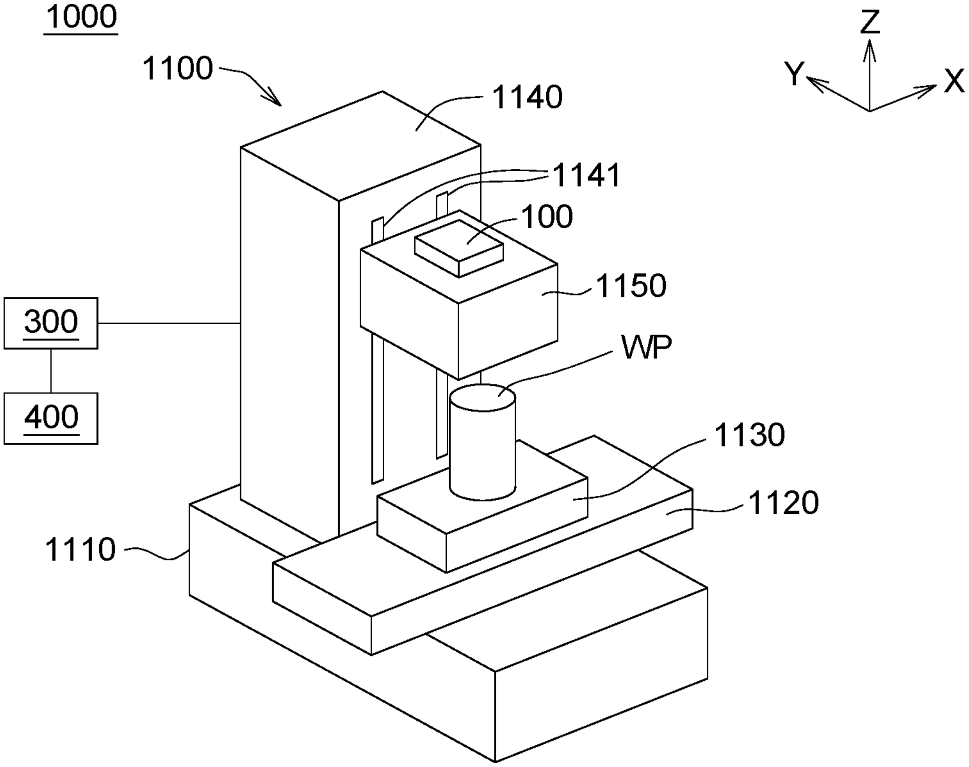
FIG. 1B is one embodiment of the vibration damping system showing that the processing machine is at a second attitude.

FIG. 1A is one embodiment of a vibration damping system 1000 showing that a processing machine 1100 is at a first attitude; FIG. 1B is one embodiment of the vibration damping system 1000 showing that the processing machine 1100 is at a second attitude.

Referring to FIG. 1A and FIG. 1B, the vibration damping system 1000 may be applied to the processing machine 1100, and includes a vibration damping device 100, a control unit 300 and a storage unit 400. The vibration damping device 100 is disposed on the processing machine 1100 and may be used for suppressing vibration of the processing machine 1100. The control unit 300 is coupled to the processing machine 1100 and the vibration damping device 100 to control the operation of the processing machine 1100 and the vibration damping device 100. The storage unit 400 is coupled to the control unit 300 and is used for storing multiple databases. In other embodiments, the storage unit 400 may be omitted and is not limited herein.

The processing machine 1100 may include a machine bed 1110, a moving table 1120, a workbench 1130, a stand 1140 and a spindle head 1150. A workpiece WP is disposed (e.g., clamped) on the workbench 1130. The workbench 1130 may be disposed on a linear guideway (not shown) along a first horizontal axis (X-axis), which is arranged on the moving table 1120 along the first horizontal axis so that the workbench 1130 may move linearly along the first horizontal axis; the moving table 1120 may be disposed on a linear guideway (not shown) along a second horizontal axis (Y-axis), which is arranged on the machine bed 1110 along the second horizontal axis so that the moving table 1120 may move linearly along the second horizontal axis. The spindle head 1150 may be disposed on a linear guideway 1141 of the stand 1140 along a vertical axis (Z-axis), so that the spindle head 1150 may move linearly along the vertical axis.

The moving table 1120, the workbench 1130 and the spindle head 1150 may be controllably movable via their respective linear drives (not shown). Here, the control unit 300 may transmit control signals to the linear drives corresponding to the moving table 1120, the workbench 1130 and the spindle head 1150, respectively, to cause the linear drives to move the moving table 1120, the workbench 1130 and the spindle head 1150 linearly. In addition, the control unit 300 may obtain the actual positions of the moving table 1120, the workbench 1130 and the spindle head 1150 via the position sensors (not shown) corresponding to the moving table 1120, the workbench 1130 and the spindle head 1150.

Figure 2A:
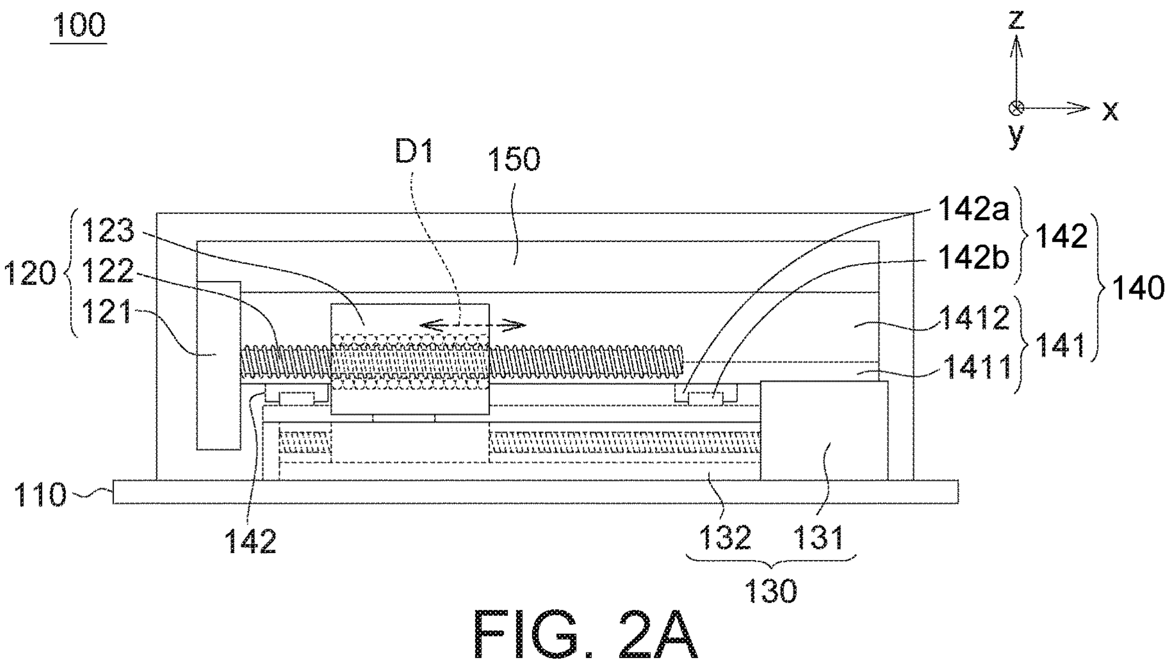
FIG. 2A is a front view of the vibration damping device according to one embodiment of the present disclosure.
Figure 2B:
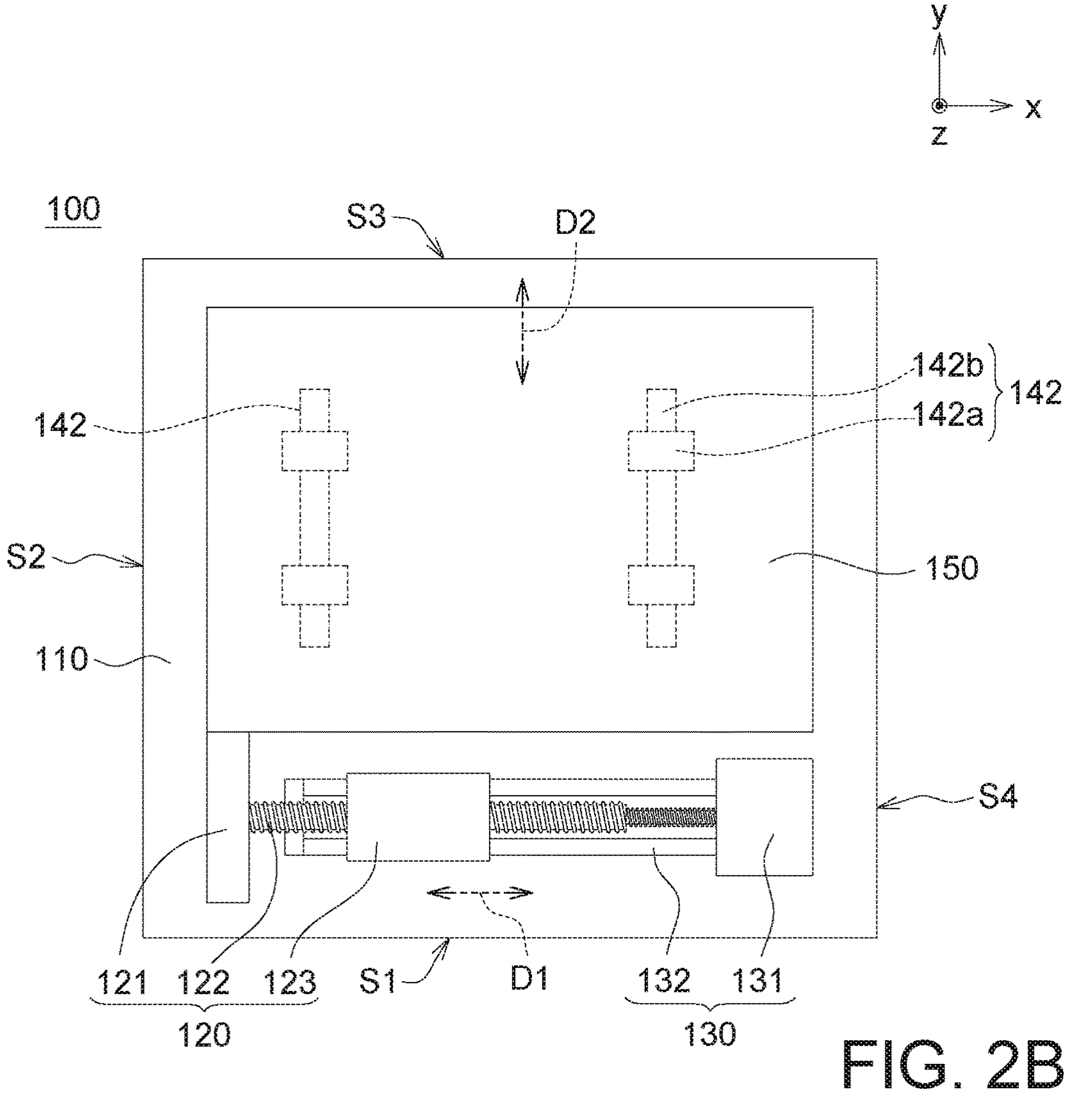
FIG. 2B is a top view of the vibration damping device in FIG. 2A.

FIG. 2A is a front view of the vibration damping device 100 according to one embodiment of the present disclosure; FIG. 2B is a top view of the vibration damping device 100 in FIG. 2A.

Referring to FIG. 2A and FIG. 2B, the vibration damping device 100 has a first side S1, a second side S2, a third side S3 and a fourth side S4. The first side S1 is opposite the third side S3, and the second side S2 is opposite the fourth side S4. The first side S1 is adjacent to the second side S2 and the fourth side S4. The third side S3 is adjacent to the second side S2 and the fourth side S4. The vibration damping device 100 may include a base 110, a rigid module 120, a drive module 130, a counterweight module 140 and a damping module 150. The rigid module 120 may be disposed adjacent to the first side S1 and may include a holder 121, a guide bar 122, and a moving member 123. One end of the guide bar 122 is connected to the holder 121, and the guide bar 122 extends along a first axis D1 (x-axis). The moving member 123 is movably disposed on the guide bar 122 along the first axis D1 (x-axis). The moving member 123 is movably disposed on the guide bar 122 along the first axis D1 (x-axis). In one embodiment, the moving member 123 may be a ball spline, but is not limited thereto. When the distance between the moving member 123 and the holder 121 is shorter, the rigidity of the rigid module 120 is higher; conversely, when the distance between the moving member 123 and the holder 121 is longer, the rigidity of the rigid module 120 is lower.

The drive module 130 may be disposed adjacent to the first side S1, disposed on the base 110, and configured to drive the moving member 123 to move along the first axis D1 (x-axis). In one embodiment, the drive module 130 may include a drive motor 131 and a linear drive unit 132. The linear drive unit 132 is connected to the moving member 123 and generates movement along the first axis D1 (x-axis) through the drive motor 131 so as to drive the moving member 123 to move along the first axis D1 (x-axis), thereby changing the rigidity of the rigid module 120. In one embodiment, the linear drive unit 132 may include a screw, a nut, and a slide. The moving member 123 may move along the slide. The nut is provided on the screw and is attached to the moving member 123. The screw may be driven by the drive motor 131 to rotate, which in turn drives the nut to move linearly, thereby moving the moving member 123 linearly along the first axis D1 (x-axis) on the slide.

As shown in FIG. 2B, the rigid module 120 is disposed opposite the drive module 130. The rigid module 120 is disposed close to the second side S2, and the driver module 130 is disposed close to the fourth side S4. In another embodiment, the rigid module 120 may be disposed close to the fourth side S4, and the driver module 130 may be disposed close to the second side S2.

The counterweight module 140 may include a counterweight mass unit 141 and a linear guider 142. The counterweight mass unit 141 has a connection plate 1411 and a counterweight mass 1412, and is connected to the holder 121; for example, the connection plate 1411 and the holder 121 are screwed together. The counterweight mass 1412 is disposed on the connection plate 1411, for example, by provided with screw threads on the connection plate 1411 and securing the counterweight mass 1412 and the connection plate 1411 with screws. The counterweight mass 1412 may be configured with different mass in different embodiments according to the needs, and is not limited herein. The linear guider 142 extends along a second axis D2 (y-axis), which is perpendicular to the first axis D1 (x-axis). The counterweight mass unit 141 is movable along the second axis D2 (y-axis) through the linear guider 142. In one embodiment, the linear guider 142 may include a slider **142*a* and a rail 142*b*. The slider 142*a* may be disposed on the counterweight mass unit 141 (for example, the slider 142*a* and the connection plate 1411 are secured together with screws) and may slide relative to the rail 142*b*, which may be disposed on the base 110, so that the counterweight mass unit 141 may move along the second axis D2 (y-axis) through the slider 142*a* and the rail 142*b*. In another embodiment, the slider 142*a* may be disposed on the base 110, and the rail 142*b* may be disposed on the counterweight mass unit 141 (for example, the rail 142*b* and the connection plate 1411** are secured together with screws).

Figure 3:
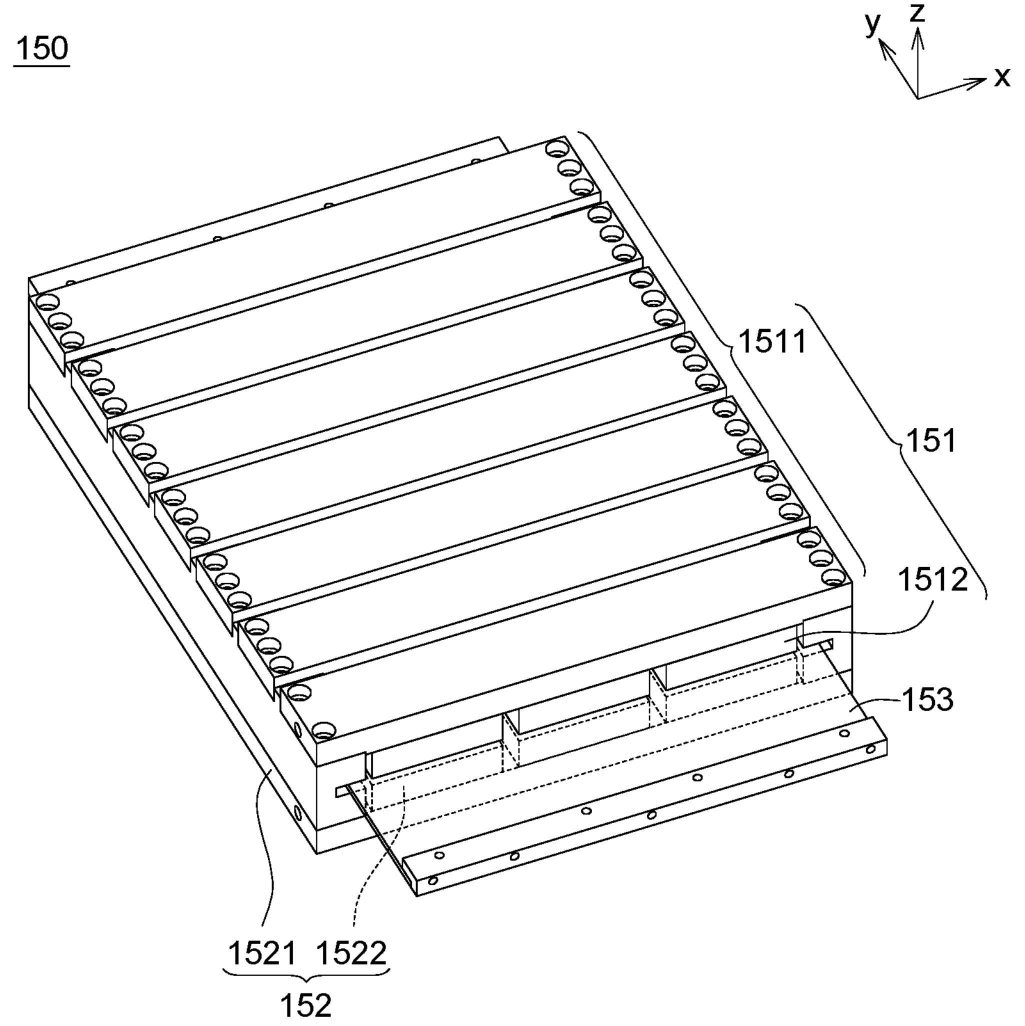
FIG. 3 shows one embodiment of the damping module.

The damping module 150 is disposed on the counterweight module 140; for example, the damping module 150 is fixed with the counterweight mass 1412 of the counterweight mass unit 141. In one embodiment, the damping module 150 may be a multidirectional eddy current damping device. Referring to FIG. 3, one embodiment of the damping module 150 is shown. The damping module 150 may include a first magnet set 151, a second magnet set 152 and a metal plate 153. The metal plate 153 is disposed between the first magnet set 151 and the second magnet set 152. The first magnet set 151 may include a first carrier 1511 and a plurality of first magnets 1512 disposed on the first carrier 1511. The second magnet set 152 may include a second carrier 1521 and a plurality of second magnets 1522 disposed on the second carrier 1521. There is a gap between the first magnets 1512 and the second magnets 1522 arranged up and down, and the metal plate 153 is disposed in the gap. That is, the metal plate 153 is disposed between the first magnets 1512 and the second magnets 1522. A magnetic field is generated between the first magnets 1512 and the second magnets 1522, allowing the metal plate 153 to move freely on the plane (xy-plane) between the first magnets 1512 and the second magnets 1522. When vibration occurs, the first magnets 1512 and the second magnets 1522 are displaced relative to the metal plate 153, and this relative movement generates eddy currents, which in turn provide a damping effect. However, the present disclosure is not limited thereto. In other embodiments, the damping module 150 may be a viscous damping module, hydraulic damping module, elastic damping module, or friction damping module, as long as it is a damping module that may produce a damping effect, and there is no limitation herein.

Referring to FIG. 1A, FIG. 1B, FIG. 2A and FIG. 2B, the vibration damping device 100 may be disposed on the processing machine 1100. For example, the vibration damping device 100 is disposed on the processing machine 1100 to provide an effect of suppressing vibration of the processing machine 1100. The vibration damping device 100 may be disposed at a location on the processing machine 1100 where vibration, or severe vibration, occurs, such as on the spindle head 1150 of the processing machine 1100. In addition to controlling the processing machine 1100, the control unit 300 controls the drive module 130 to change the position of the moving member 123 in the first axis D1 (x-axis) according to the vibration frequency of the processing machine 1100 in real time. The vibration frequency of the vibration damping device 100 is altered by changing the rigidity of the rigid module 120, so that the vibration frequency of the vibration damping device 100 matches the vibration frequency of the processing machine 1100. In this way, when the processing machine 1100 generates different vibration frequencies, the control unit 300 is also capable of immediately causing the vibration damping device 100 to generate continuous and uninterrupted vibration damping effects according to the changes in the vibration frequency of the processing machine 1100.

In one embodiment, the control unit 300 may detect the position of the spindle head 1150 in a vertical axis (Z-axis) in real time and control the drive module 130 to change the position of the moving member 123 in the first axis D1 (x-axis). The first axis D1 (x-axis) and the second axis D2 (y-axis) shown in FIG. 2A and FIG. 2B may be horizontal, i.e., corresponding to any direction of the X-axis, the Y-axis, or the XY-plane of FIG. 1A and FIG. 1B, which is mutually perpendicular to the vertical axis (Z-axis). Herein, the storage unit 400 may store a processing machine database and a vibration damping device database. The processing machine database may include a correspondence between the vibration frequency of the processing machine 1100 and the position of the spindle head 1150 in the vertical axis (Z-axis), and record the distance of the spindle head 1150 from the surface of the workbench 1130 in the vertical axis (Z-axis) and the corresponding vibration frequency of the processing machine 1100. The vibration damping device database may include a correspondence between the vibration frequency of the vibration damping device 100 and the position of the moving member 123 in the first axis D1 (x-axis), and record the distance of the moving member 123 in the first axis D1 (x-axis) from the holder 121, and the corresponding vibration frequency of the vibration damping device 100. For example, the processing machine database and the vibration damping device database may be shown in Table I:

TABLE I

| Processing machine database | | Vibration damping device database | |
|---|---|---|---|
| Vibration frequency (Hz) | Position of spindle head in vertical axis (mm) | Vibration frequency (Hz) | Position of moving member in first axis (mm) |
| 45 | 100 | 45 | 10 |
| 50 | 200 | 50 | 20 |
| 55 | 300 | 55 | 30 |
| 60 | 400 | 60 | 40 |

The control unit 300 may control the drive module 130 to change the position of the moving member 123 in the first axis D1 (x-axis) by detecting the position of the spindle head 1150 in the vertical axis in real time, so that the vibration frequency of the vibration damping device 100 matches the vibration frequency of the processing machine 1100. As shown in Table I, if the control unit 300 detects that the position of the spindle head 1150 in the vertical axis is 200 mm, which means that the vibration frequency of the processing machine 1100 is currently 50 Hz, the control unit 300 may know that the position of the moving member 123 in the first axis D1 (x-axis) should be 20 mm based on the processing machine database and the vibration damping device database in the storage unit 400 so as to match the vibration frequency of the vibration damping device 100 with that of the processing machine 1100. On the other hand, if the control unit 300 detects that the position of the spindle head 1150 in the vertical axis is not recorded in the processing machine database, the control unit 300 may calculate the corresponding position of the moving member 123 by interpolation. By comparing the two databases with each other, the vibration damping device 100 may produce an instant vibration damping effect in response to real-time changes in the vibration frequency of the processing machine 1100.

Figure 4:
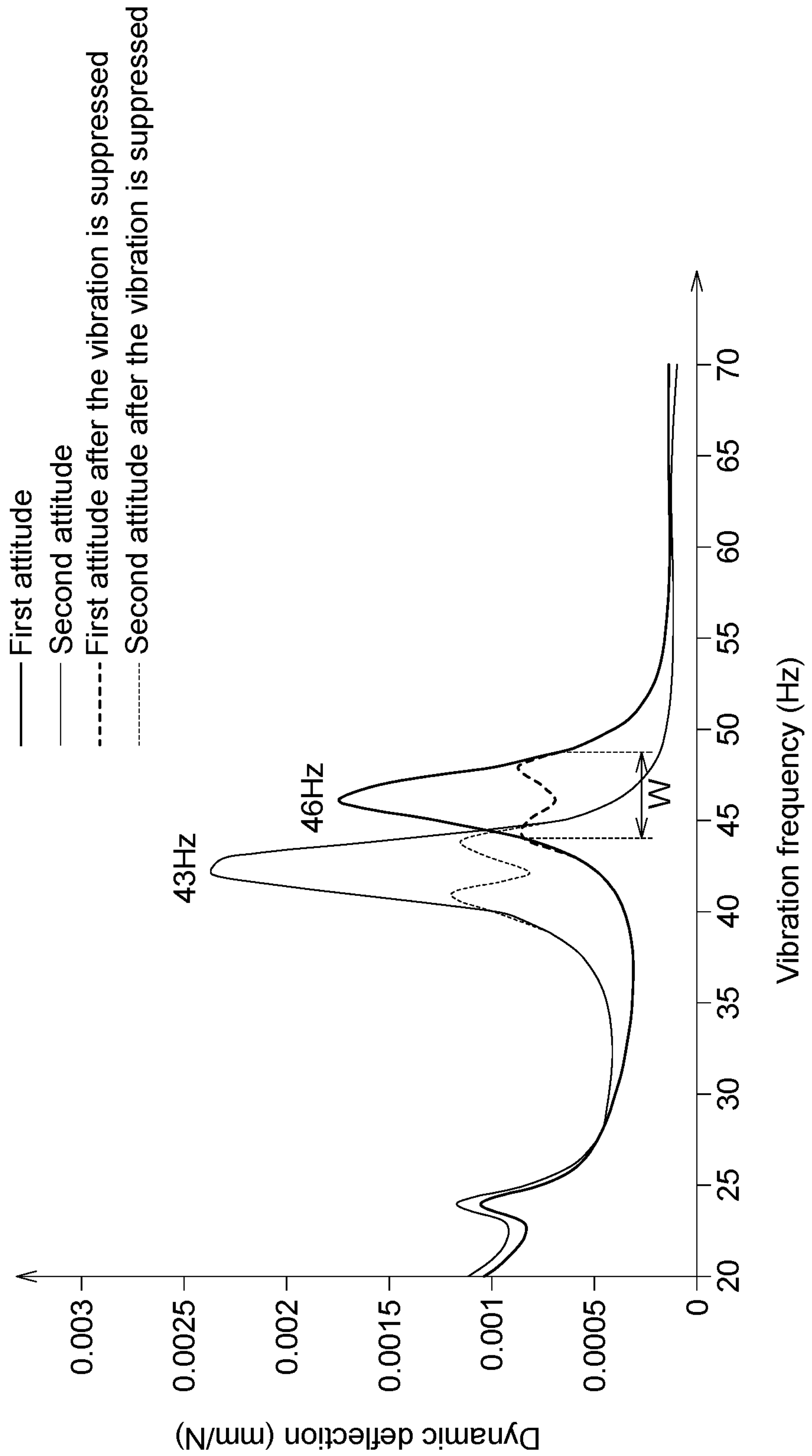
FIG. 4 is one embodiment showing the vibration damping effect of the vibration damping system.

FIG. 4 is one embodiment showing the vibration damping effect of the vibration damping system 1000. Referring to FIG. 1A, FIG. 1B and FIG. 4, when the processing machine 1100 is manufacturing or machining different workpieces WP, or during the manufacturing or machining of a workpiece WP, the processing machine 1100 will be located in different attitudes. For example, the processing machine 1100 of FIG. 1A is at a first attitude with a vibration frequency of 46 Hz, and the processing machine 1100 of FIG. 1B is at a second attitude with a vibration frequency of 43 Hz. Therefore, when the attitude of the processing machine 1100 changes, the vibration frequency of the processing machine 1100 changes as well. The control unit 300 may immediately cause the vibration damping device 100 to generate continuous and uninterrupted vibration damping effects according to the change in the vibration frequency of the processing machine 1100. For example, when the processing machine 1100 changes from the first attitude to the second attitude, the control unit 300 may search for a corresponding position of the moving member 123 in the first axis D1 (x-axis) from the processing machine database and the vibration damping device database stored in the storage unit 400 according to the position of the spindle head 1150 in the vertical axis, and then control the drive module 130 to change the position of the moving member 123 in the first axis D1 (x-axis), so that the vibration frequency of the vibration damping device 100 is changed from 46 Hz to 43 Hz to match the vibration frequency of the processing machine 1100. As shown in FIG. 4, the magnitude of the dynamic deflection of the processing machine 1100 may be significantly improved whether the processing machine 1100 is at the vibration frequency of 46 Hz or at 43 Hz.

Referring to FIG. 3 and FIG. 4, in one embodiment, the size of the frequency interval W of vibration may be adjusted by changing the thickness (length along the z-axis) of the metal plate 153 of the damping module 150 to determine the frequency range in which the vibration damping device 100 may suppress the dynamic deflection of the processing machine 1100. For example, if the metal plate 153 of the damping module 150 is thicker, the vibration damping device 100 is capable of suppressing the dynamic deflection of the processing machine 1100 over a wider frequency interval W of vibration.

Figure 5A:
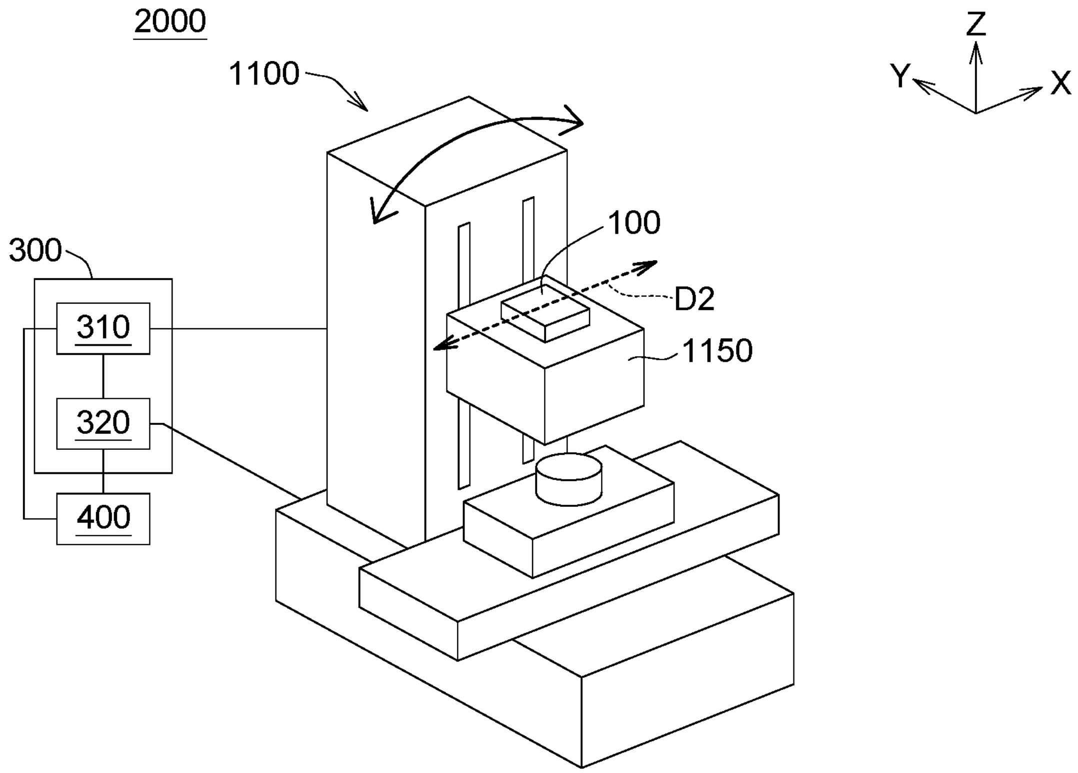
FIG. 5A is another embodiment of a vibration damping system showing that the mode of vibration of the processing machine is a sway-type vibration.
Figure 5B:
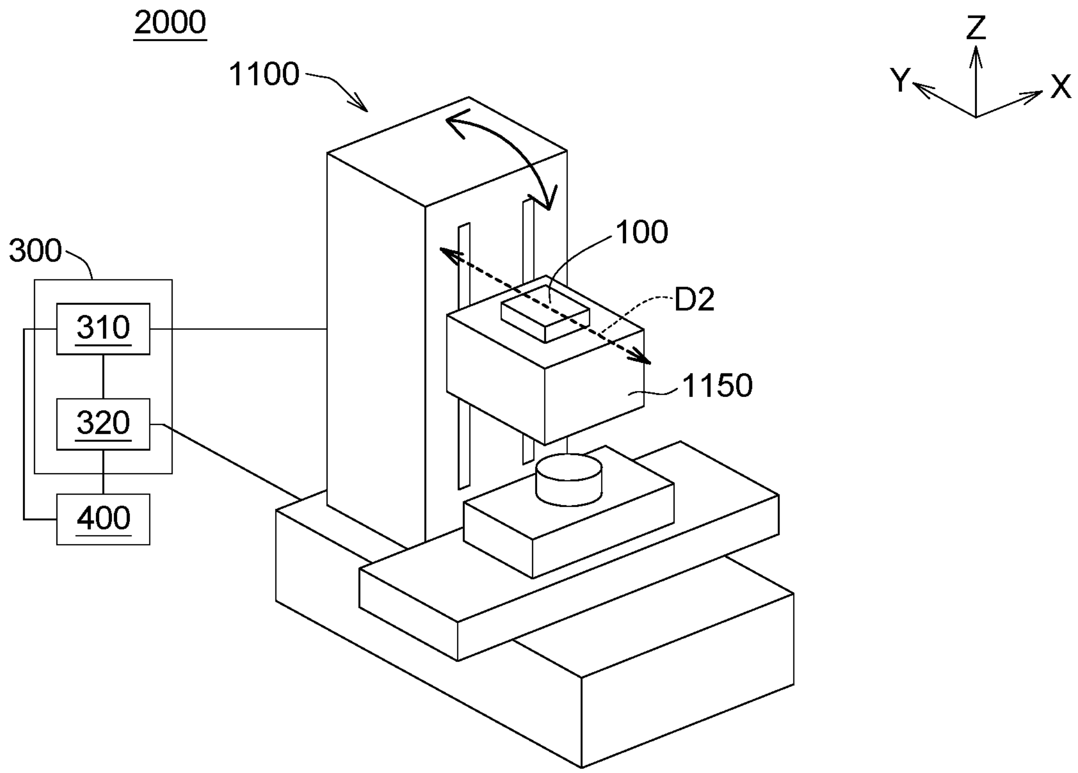
FIG. 5B is another embodiment of the vibration damping system showing that the mode of vibration of the processing machine is a nod-type vibration.

FIG. 5A is another embodiment of a vibration damping system 2000 showing that the mode of vibration of the processing machine 1100 is a sway-type vibration; FIG. 5B is another embodiment of the vibration damping system 2000 showing that the mode of vibration of the processing machine 1100 is a nod-type vibration.

In one embodiment, as shown in FIG. 2A, FIG. 5A and FIG. 5B, the control unit 300 may include a first controller 310 and a second controller 320 coupled to the storage unit 400, respectively. The first controller 310 and the second controller 320 may be configured for controlling the operation of the processing machine 1100 and the vibration damping device 100, respectively. The first controller 310 and the second controller 320 may communicate with each other, so that when the first controller 310 is controlling the processing machine 1100, the second controller 320 may also control the drive module 130 to change the position of the moving member 123 in the first axis D1 according to the vibration frequency of the processing machine 1100 in real time.

In one embodiment, the vibration damping device 100 may be positioned according to the mode of vibration of the processing machine 1100. Referring to FIG. 5A, when the mode of vibration of the processing machine 1100 is a sway-type vibration, the processing machine 1100 oscillates along the X-axis, and the vibration damping device 100 is positioned in such a way that the second axis D2 corresponds to the vibration direction of the sway-type vibration, so that the second axis D2 corresponds to the X-axis. Referring to FIG. 5B, when the mode of vibration of the processing machine 1100 is a nod-type vibration, the processing machine 1100 oscillates along the Y-axis, and the vibration damping device 100 is positioned in such a way that the second axis D2 corresponds to the vibration direction of the nod-type vibration, so that the second axis D2 corresponds to the Y-axis. In another embodiment, if the mode of vibration of the processing machine 1100 is a jump-type vibration along the Z-axis, the vibration damping device 100 is positioned in such a way that the second axis D2 corresponds to the vibration direction of the jump-type vibration, so that the second axis D2 corresponds to the Z-axis. In other words, the vibration damping device 100 may be positioned in accordance with the vibration direction of the processing machine 1100, so that the second axis D2 corresponds to the vibration direction.

Figure 6A:
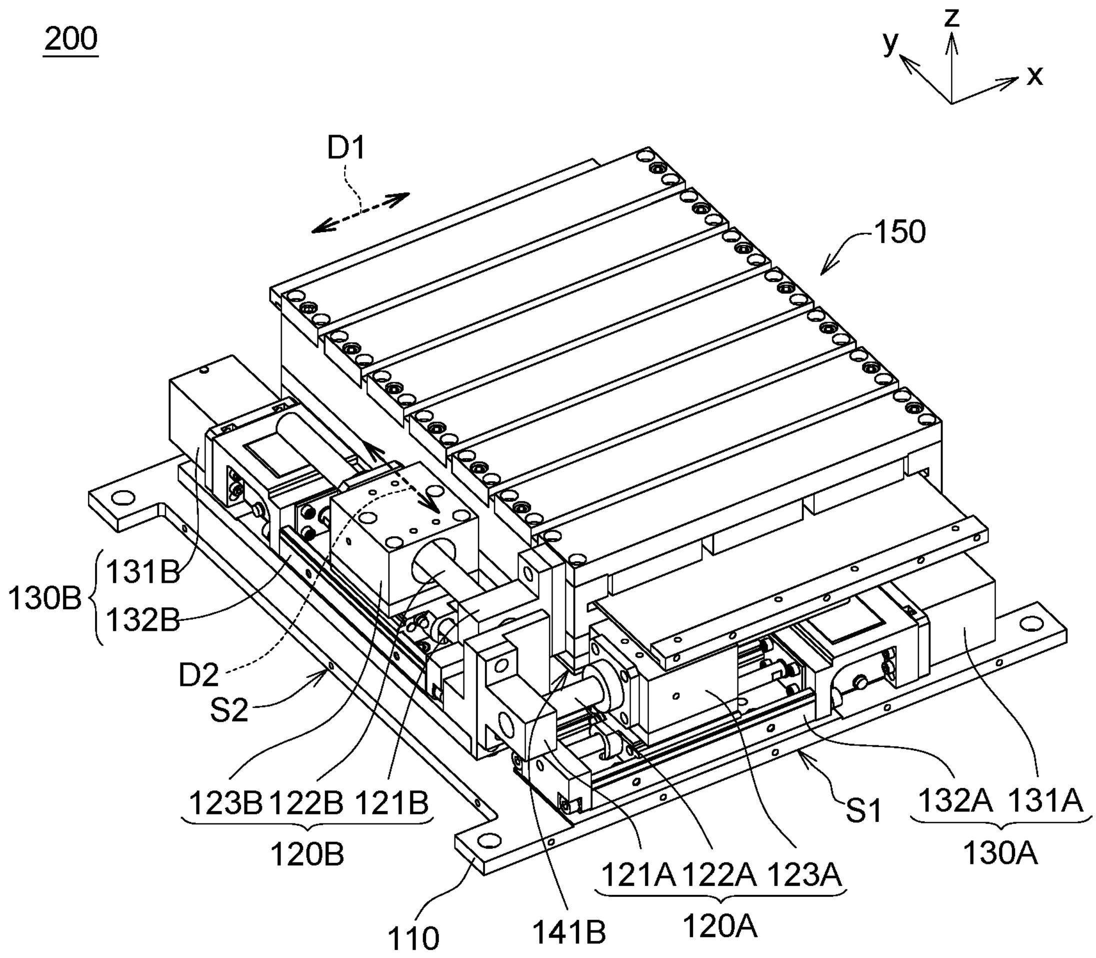
FIG. 6A is a schematic diagram of a vibration damping device according to another embodiment of the present disclosure.
Figure 6B:
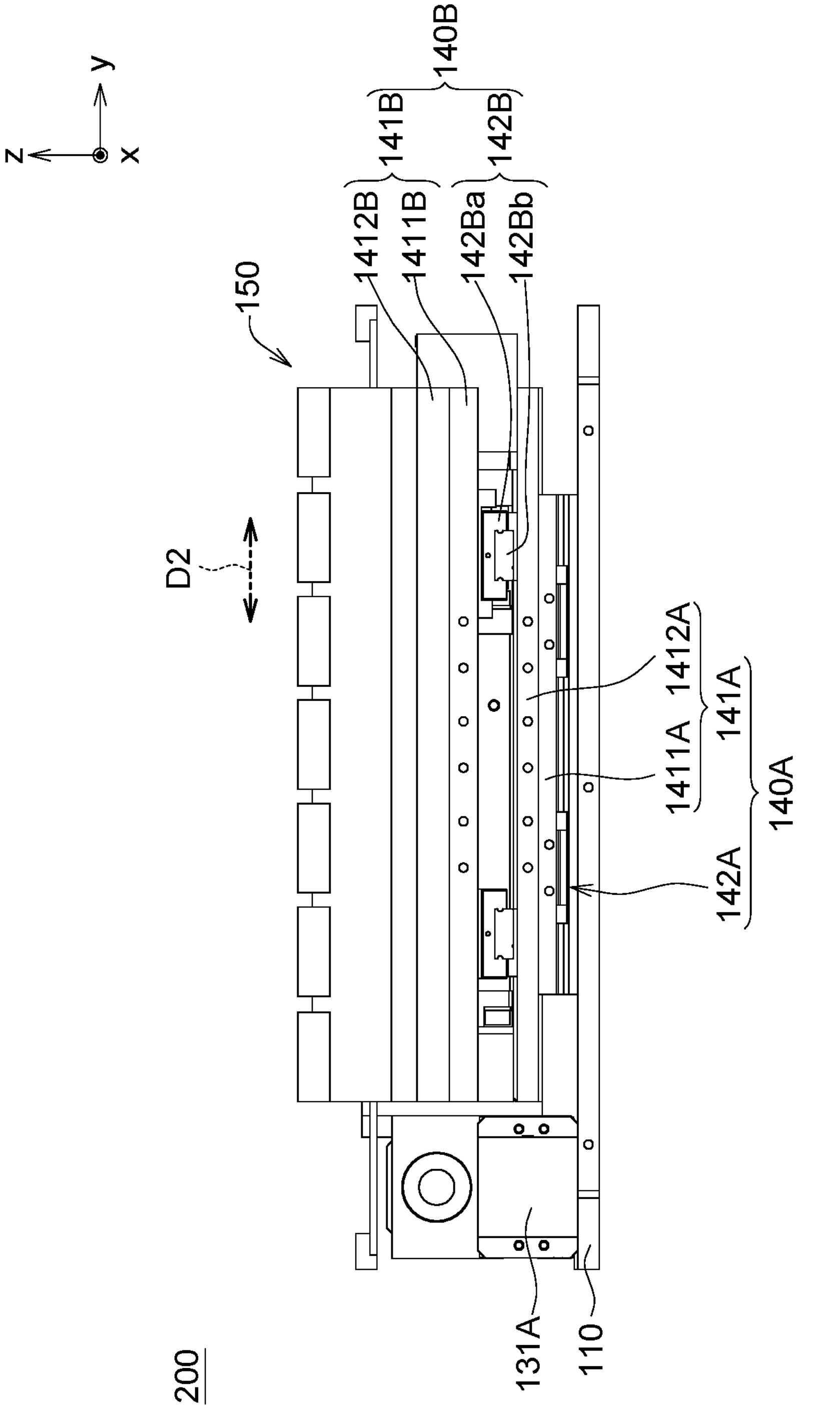
FIG. 6B is a right side view of the vibration damping device in FIG. 6A.

FIG. 6A is a schematic diagram of a vibration damping device 200 according to another embodiment of the present disclosure; FIG. 6B is a right side view of the vibration damping device 200 in FIG. 6A.

Referring to FIG. 6A and FIG. 6B, in one example, the vibration damping device 200 may be applied to a processing machine 1100 with the mode of vibration of a sway-type vibration or a nod-type vibration. The vibration damping device 200 in FIG. 6A and FIG. 6B differs from the vibration damping device 100 in FIG. 2A and FIG. 2B in that the vibration damping device 200 includes two sets of rigid modules, two sets of drive modules, and two sets of counterweight modules. The two sets of rigid modules include a first rigid module 120A and a second rigid module 120B, respectively. The two sets of drive modules include a first drive module 130A and a second drive module 130B, respectively. The two sets of counterweight modules include a first counterweight module 140A and a second counterweight module 140B, respectively.

The first rigid module 120A includes a first holder 121A, a first guide bar 122A and a first moving member 123A, and its structure and configuration are the same as that of the rigid module 120 of the vibration damping device 100 in FIG. 2A and FIG. 2B and will not be repeated herein. The second rigid module 120B may be disposed adjacent to the second side S2, and may include a second holder 121B, a second guide bar 122B and a second moving member 123B. One end of the second guide bar 122B is connected to the second holder 121B, and the second guide bar 122B extends along the second axis D2 (y-axis). The second moving member 123B is movably disposed on the second guide bar 122B along the second axis D2 (y-axis). In one embodiment, the second moving member 123B may be a ball spline, but is not limited thereto. When the distance between the second moving member 123B and the second holder 121B is shorter, the rigidity of the second rigid module 120B is higher; conversely, when the distance between the second moving member 123B and the second holder 121B is longer, the rigidity of the second rigid module 120B is lower.

The first drive module 130A includes a first drive motor 131A and a first linear drive unit 132A, and its structure and configuration are the same as that of the drive module 130 of the vibration damping device 100 in FIG. 2A and FIG. 2B and will not be repeated herein. The second drive module 130B may be disposed adjacent to the second side S2, disposed on the base 110, and configured to drive the second moving member 123B to move along the second axis D2 (y-axis). In one embodiment, the second drive module 130B may include a second drive motor 131B and a second linear drive unit 132B. The second linear drive unit 132B is connected to the second moving member 123B and generates movement in the second axis D2 (y-axis) through the second drive motor 131B so as to drive the second moving member 123B to move along the second axis D2 (y-axis), thereby changing the rigidity of the second rigid module 120B. In one embodiment, the second linear drive unit 132B may include a screw, a nut, and a slide. The second moving member 123B may move along the slide. The nut is provided on the screw and is attached to the second moving member 123B. The screw may be driven by the second drive motor 131B to rotate, which in turn drives the nut to move linearly, thereby moving the second moving member 123B linearly in the second axis D2 (y-axis) on the slide.

The first counterweight module 140A includes a first counterweight mass unit 141A and a first linear guider 142A, wherein the first counterweight mass unit 141A has a first connection plate 1411A and a first counterweight mass 1412A. The structure and configuration of the first counterweight module 140A are similar to that of the counterweight module 140 of the vibration damping device 100 in FIG. 2A and FIG. 2B, and will not be repeated herein. The second counterweight module 140B may include a second counterweight mass unit 141B and a second linear guider 142B disposed between the damping module 150 and the first counterweight module 140A. The second counterweight mass unit 141B has a second connection plate 1411B and a second counterweight mass 1412B, and the second counterweight mass 1412B is disposed on the second connection plate 1411B, for example, by provided with screw threads on the second connection plate 1411B and securing the second counterweight mass 1412B and the second connection plate 1411B with screws. The second counterweight mass 1412B may be configured with different mass in different embodiments according to the needs, and is not limited herein. The second counterweight mass unit 141B is connected to the second holder 121B; for example, after the second counterweight mass unit 141B is fixed to the damping module 150, the damping module 150 is then fixed to the second holder 121B, or the second counterweight mass unit 141B is fixed directly to the second holder 121B. The second linear guider 142B extends along the first axis D1 (x-axis). The second counterweight mass unit 141B is movable in the first axis D1 (x-axis) through the second linear guider 142B. In one embodiment, the second linear guider 142B may include a second slider 142Ba and a second rail 142Bb. The second slider 142Ba may be disposed on the second counterweight mass unit 141B, and the second rail 142Bb may be disposed on the first counterweight mass unit 141A, so that the second counterweight mass unit 141B may move along the first axis D1 (x-axis) through the second slider 142Ba and the second rail 142Bb. In another embodiment, the second slider 142Ba may be disposed on the first counterweight mass unit 141A, and the second rail 142Bb may be disposed on the second counterweight mass unit 141B.

Referring to FIG. 5A, FIG. 5B and FIG. 6A, the first axis D1 and the second axis D2 may correspond to the vibration direction of the sway-type vibration and the nod-type vibration, respectively, so that the vibration damping device 200 may be applied to the processing machine 1100 with the mode of vibration of the sway-type vibration or the nod-type vibration without changing the position of the vibration damping device 200.

In summary, according to the present disclosure, the vibration damping system for a processing machine and the vibration damping device for suppressing vibration of the processing machine may adjust the vibration frequency of the vibration damping device according the vibration frequency of the processing machine in real time, so that the two vibration frequencies may match with each other, and continuous and uninterrupted vibration damping effects may be generated. Adjusting the vibration frequency of the vibration damping device may be achieved by changing the rigidity of the rigid module, for example, by changing the rigidity of the rigid module by changing the position of the moving member in the first axis. In one embodiment, a processing machine database and a vibration damping device database may be established in advance, and the control unit only needs to detect the position of the spindle head in the vertical axis, and then it may immediately obtain the position of the moving member according to the processing machine database and the vibration damping device database, so that the vibration damping device may produce an instant vibration damping effect in response to the change of the vibration frequency of the processing machine. In addition, the user may also change the rigid module of the vibration damping device and the counterweight mass of the counterweight module at any time in response to the vibration characteristics of the equipment of the processing machine, so as to adjust the vibration frequency range of the vibration damping device. Moreover, if the damping module is a multidirectional eddy current damping device, the size of the frequency interval of vibration may be adjusted by changing the thickness of the metal plate of the damping module to determine the frequency range in which the vibration damping device may suppress the dynamic deflection of the processing machine.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A vibration damping system for a processing machine comprising:

- a vibration damping device comprising:
  - a base disposed on the processing machine;
  - a first rigid module comprising a first holder, a first guide bar and a first moving member, one end of the first guide bar connected to the first holder, the first moving member movably disposed on the first guide bar along a first axis;
  - a first drive module disposed on the base and configured to drive the first moving member to move along the first axis;
  - a first counterweight module comprising a first counterweight mass unit and a first linear guider, the first linear guider extending along a second axis perpendicular to the first axis, the first counterweight mass unit connected to the first holder and movable in the second axis through the first linear guider; and
  - a damping module disposed on the first counterweight module; and
- a control unit configured to control the processing machine and to control the first drive module to change a position of the first moving member in the first axis according to a vibration frequency of the processing machine in real time, so that a vibration frequency of the vibration damping device matches the vibration frequency of the processing machine.

2. The vibration damping system according to claim 1, wherein the processing machine comprises a stand and a spindle head, the spindle head is controllably and linearly movable in a vertical axis on the stand by the control unit, and the control unit controls the first drive module to change the position of the first moving member in the first axis by detecting a position of the spindle head in the vertical axis in real time.

3. The vibration damping system according to claim 2, further comprising a storage unit, wherein the storage unit stores a processing machine database and a vibration damping device database, the processing machine database comprises a correspondence between the vibration frequency and the position of the spindle head in the vertical axis, the vibration damping device database comprises a correspondence between the vibration frequency and the position of the first moving member in the first axis, and the control unit is coupled to the storage unit for controlling the first drive module to change the position of the first moving member in the first axis by detecting the position of the spindle head in the vertical axis in real time, so that the vibration frequency of the vibration damping device matches the vibration frequency of the processing machine.

4. The vibration damping system according to claim 2, wherein the vertical axis is perpendicular to the first axis and the second axis.

5. The vibration damping system according to claim 2, wherein the vibration damping device is disposed on the spindle head of the processing machine.

6. The vibration damping system according to claim 1, wherein the vibration damping device is positioned so that the second axis corresponds to a vibration direction of the processing machine.

7. The vibration damping system according to claim 1, wherein a mode of vibration of the processing machine is a sway-type vibration or a nod-type vibration, and the vibration damping device is positioned so that the second axis corresponds to a vibration direction of the sway-type vibration or the nod-type vibration.

8. The vibration damping system according to claim 1, wherein the damping module comprises a first magnet set, a second magnet set and a metal plate, and the metal plate is disposed between the first magnet set and the second magnet set.

9. The vibration damping system according to claim 8, wherein as the metal plate is thicker, the vibration damping device is capable of suppressing a dynamic deflection of the processing machine over a wider frequency interval of vibration.

10. The vibration damping system according to claim 1, wherein the control unit comprises a first controller and a second controller, the first controller is configured for controlling the processing machine, and the second controller is configured for controlling the first drive module to change the position of the first moving member in the first axis according to the vibration frequency of the processing machine in real time.

11. The vibration damping system according to claim 1, wherein the vibration damping device further comprises:

a second rigid module comprising a second holder, a second guide bar and a second moving member, one end of the second guide bar connected to the second holder, the second moving member movably disposed on the second guide bar along the second axis;

a second drive module disposed on the base and configured to drive the second moving member to move along the second axis; and a second counterweight module comprising a second counterweight mass unit and a second linear guider, the second linear guider extending along the first axis, the second counterweight mass unit connected to the second holder and movable in the first axis through the second linear guider;

wherein the control unit is further configured to control the second drive module to change a position of the second moving member in the second axis according to the vibration frequency of the processing machine in real time.

12. The vibration damping system according to claim 11, wherein the vibration damping device is provided with a first side and a second side adjacent to each other, the first rigid module is disposed adjacent to the first side, and the second rigid module is disposed adjacent to the second side.

13. A vibration damping device for suppressing vibration of a processing machine, the vibration damping device comprising:

a base disposed on the processing machine;

a first rigid module comprising a first holder, a first guide bar and a first moving member, one end of the first guide bar connected to the first holder, the first moving member movably disposed on the first guide bar along a first axis;

a first drive module disposed on the base and configured to drive the first moving member to move along the first axis;

a first counterweight module comprising a first counterweight mass unit and a first linear guider, the first linear guider extending along a second axis perpendicular to the first axis, the first counterweight mass unit connected to the first holder and movable in the second axis through the first linear guider; and a damping module disposed on the first counterweight module;

wherein the first drive module changes a position of the first moving member in the first axis in response to a vibration frequency of the processing machine, so that a vibration frequency of the vibration damping device matches the vibration frequency of the processing machine.

14. The vibration damping device according to claim 13, wherein the vibration damping device is positioned so that the second axis corresponds to a vibration direction of the processing machine.

15. The vibration damping device according to claim 13, wherein the vibration damping device is disposed on a spindle head of the processing machine.

16. The vibration damping device according to claim 13, wherein a mode of vibration of the processing machine is a sway-type vibration or a nod-type vibration, and the vibration damping device is positioned so that the second axis corresponds to a vibration direction of the sway-type vibration or the nod-type vibration.

17. The vibration damping device according to claim 13, wherein the damping module comprises a first magnet set, a second magnet set and a metal plate, and the metal plate is disposed between the first magnet set and the second magnet set.

18. The vibration damping device according to claim 17, wherein as the metal plate is thicker, the vibration damping device is capable of suppressing a dynamic deflection of the processing machine over a wider frequency interval of vibration.

19. The vibration damping device according to claim 13, further comprising:

a second rigid module comprising a second holder, a second guide bar and a second moving member, one end of the second guide bar connected to the second holder, the second moving member movably disposed on the second guide bar along the second axis;

a second drive module disposed on the base and configured to drive the second moving member to move along the second axis; and a second counterweight module comprising a second counterweight mass unit and a second linear guider, the second linear guider extending along the first axis, the second counterweight mass unit connected to the second holder and movable in the first axis through the second linear guider;

wherein the second drive module changes a position of the second moving member in the second axis in response to the vibration frequency of the processing machine.

20. The vibration damping device according to claim 19, wherein the vibration damping device is provided with a first side and a second side adjacent to each other, the first rigid module is disposed adjacent to the first side, and the second rigid module is disposed adjacent to the second side.

* * * * *